C. N. WALKER.
HEADLIGHT MECHANISM FOR AUTOMOBILES.
APPLICATION FILED AUG. 25, 1917.
1,271,395.
Patented July 2, 1918.
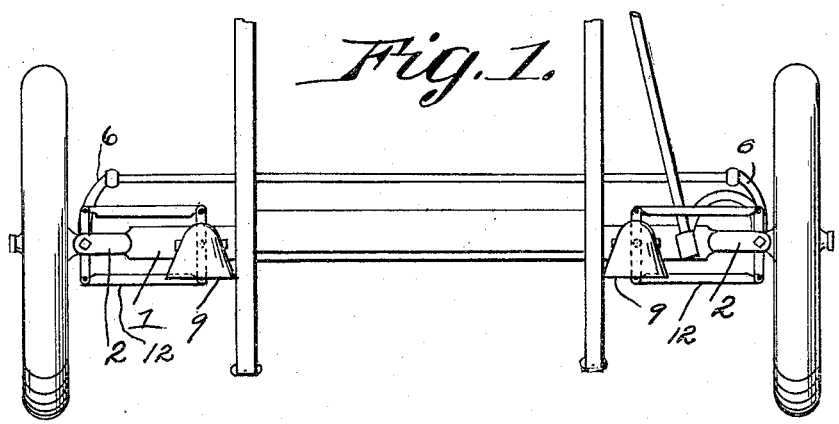
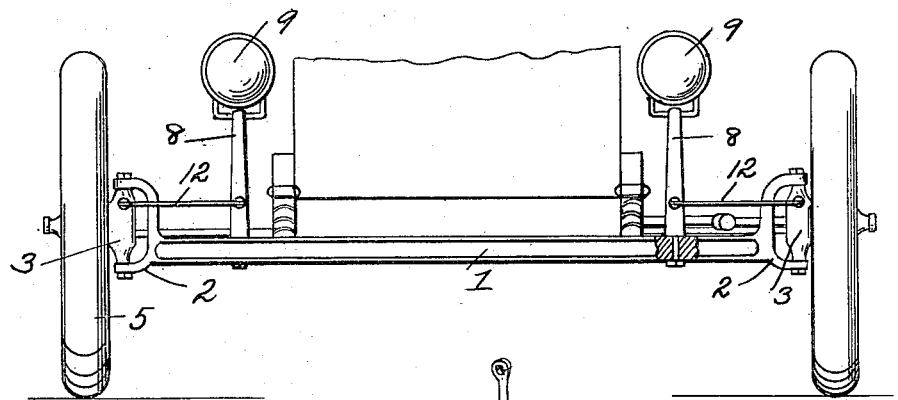
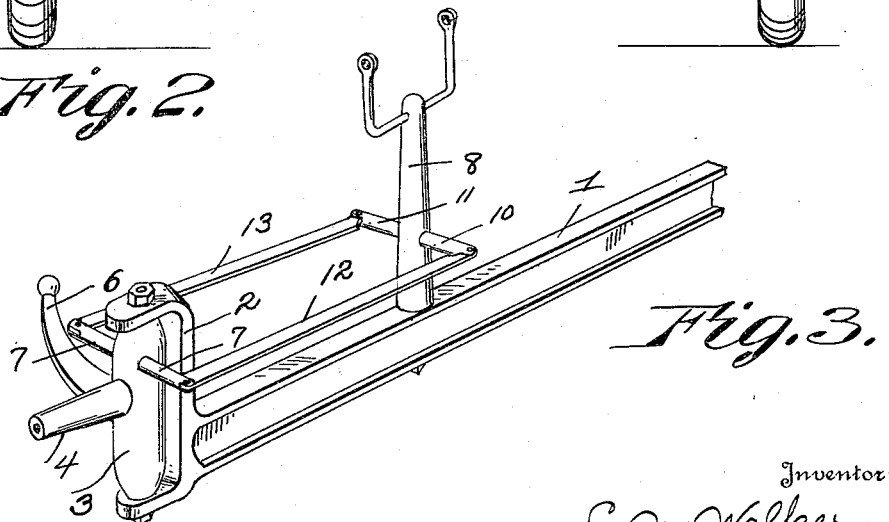
Inventor
C. N. Walker

UNITED STATES PATENT OFFICE.

CHARLES N. WALKER, OF JAMESTOWN, COLORADO.

HEADLIGHT MECHANISM FOR AUTOMOBILES.

1,271,395.   Specification of Letters Patent.   Patented July 2, 1918.

Application filed August 25, 1917. Serial No. 188,194.

*To all whom it may concern:*

Be it known that I, CHARLES N. WALKER, a citizen of the United States, residing at Jamestown, in the county of Boulder and State of Colorado, have invented new and useful Improvements in Headlight Mechanism for Automobiles, of which the following is a specification.

My present invention relates to headlight mechanism for motor vehicles of various descriptions; and it consists in the simple, compact and reliable mechanism hereinafter described and definitely claimed for transmitting the motion of the forward wheel-bearing knuckles to headlights whereby the headlights will be moved in concert with the forward wheels when the latter are moved for steering purposes so that the beams of light from the headlights will always be thrown in the direction in which the motor vehicle is proceeding.

With the foregoing in mind, the invention will be fully understood from the following description and claims when the same are read in connection with the drawings, accompanying and forming part of this specification, in which:

Figure 1 is a top plan view illustrative of so much of an automobile or motor vehicle as is necessary to illustrate the application of my invention.

Fig. 2 is a front elevation of the same.

Fig. 3 is an enlarged detailed perspective showing one end portion of the front axle of the automobile and my novel mechanism thereon.

Similar numerals of reference designate corresponding parts in all of the views of the drawings.

The front axle 1 may be and preferably is of the ordinary well known construction at present in use, being provided at its ends with the vertically-disposed heads 2.

Journaled at their upper and lower ends in the said heads 2 are knuckles 3 which are provided with the usual spindles 4 to carry steering wheels 5 and are also provided with the rearwardly extending arms 6 for the connection of the conventional or any other approved steering mechanism. In furtherance of my invention, each knuckle 3 is provided with forwardly and rearwardly extending arms 7. Also, in furtherance of my invention, posts 8 are supported upon and journaled in the axle 1 in such manner that said posts are adapted to turn about their axes. These posts 8 are suitably adapted at their upper ends to carry headlights 9, and at intermediate points in their height the posts are provided with forwardly and rearwardly extending arms 10 and 11 respectively. Interposed between and connecting the arms 7 and 10 is a link 12 while interposed between and connecting the rear arms 7 and 11 is a link 13; said links being arranged above and substantially parallel to the axle 1 as illustrated.

Both end portions of the axle 1 are similarly equipped and from this it will be understood that the headlights 9 will be moved consonant with the forward wheels of the motor vehicle when said wheels are swung in one direction or the other incidental to the steering of the motor vehicle. From this it follows that the beams of light from the headlights 9 will always be directed in the direction in which the motor vehicle is proceeding.

It will be manifest from the foregoing that when deemed expedient the posts 8 may be carried upwardly through the mud guards (not shown) with which automobiles are ordinarily equipped.

It will be gathered from the foregoing that my novel headlight mechanism is simple and compact as well as adapted to withstand the rough usage to which automobile appurtenances are ordinarily subjected; and it will also be gathered that my mechanism is susceptible of ready application to automobiles at present in use without entailing changes in the construction thereof, other than the provision of the arms 7 on the knuckles 3, the mounting of the posts 8 on the axle 1, and the connections between the headlight-bearing posts and the knuckle arms.

Having described my invention, what I claim and desire to secure by Letters Patent is:

The combination of the front axle of a motor vehicle, having heads at its ends, vertically-disposed knuckles journaled in said heads and having wheel-bearing spindles and means for the connection of steering gear and also having lateral arms, posts supported on and journaled in the axle to turn about their axes and having lateral arms, links connecting the arms of the knuckles and the arms on the posts, and headlights mounted on the posts.

In testimony whereof I have hereunto set my hand in presence of two subscribing witnesses.

CHARLES N. WALKER.

Witnesses:
MERTON TOWER,
RALPH WALKER.

Copies of this patent may be obtained for five cents each, by addressing the "Commissioner of Patents, Washington, D. C."